United States Patent [19]
Siren

[11] 3,964,327
[45] June 22, 1976

[54] AUTOMATIC SYNCHRONIZED PITCH CONTROLS FOR PAIRS OF DRIVER AND DRIVEN V PULLEY DRIVES

[76] Inventor: Andrew Oscar Siren, 1011 Fairmount Drive SE., Calgary, Alberta, Canada

[22] Filed: Oct. 21, 1974

[21] Appl. No.: 516,381

[30] Foreign Application Priority Data
Oct. 23, 1973 Canada.................................. 49282

[52] U.S. Cl............................ 74/230.17 A; 180/6.2; 74/722
[51] Int. Cl.² .................... F16H 55/52; B62D 11/02
[58] Field of Search............ 74/230.17 A, 15.6, 722; 180/6.2, 6.66, 6.7

[56] References Cited
UNITED STATES PATENTS

| | | | |
|---|---|---|---|
| 1,890,975 | 12/1932 | Erdahl................................. | 74/15.6 |
| 2,529,489 | 11/1950 | Curtis................................... | 180/6.7 |
| 3,343,621 | 9/1967 | Doorne................................. | 180/6.2 |
| 3,572,454 | 3/1971 | Siren.................................... | 180/6.2 |
| 3,715,928 | 2/1973 | Case et al. .................... | 74/230.17 A |
| 3,743,043 | 7/1973 | Gelinas................................ | 180/6.2 |
| 3,871,461 | 3/1975 | Ehrlich................................. | 180/6.2 |

*Primary Examiner*—Samuel Scott
*Assistant Examiner*—A. Russell Burke
*Attorney, Agent, or Firm*—Stanley G. Ade

[57] ABSTRACT

In a vehicle or the like, a source of power is connected to a drive shaft. Two pairs of pulley halves are splined to this shaft and can be moved apart and together and are rotated by the shaft. Driven shafts also carry pairs of pulley halves which are splined thereto and can be moved therealong and belts extend between corresponding pulley halves on the drive shaft and corresponding pulley halves on the driven shafts. A pair of spur gears are journalled for partial rotation and mesh with one another, there being one pair for each two sets of pulley halves and a third drive gear engages between the innermost gears of said spur gears so that movement of this drive gear causes equal and simultaneous rotation of the spur gears. Levers are secured to the spur gears and are operatively connected to the pulley halves so that when the drive gear is rotated, one of the sets of pulley halves are moved apart on one of the shafts whereas the other set are moved together by equal amount and vice versa. This permits belts extending between the sets of pulley halves to increase or decrease the speed of the driven shafts. The drive gear is connected to a steering mechanism and with the driven shaft being connected to the drive wheels on each side of the vehicle, easy and accurate steering is accomplished by speeding up one set of drive wheels and decreasing the speed of the other and vice versa. A winch assembly is connected to the drive shaft by a similar arrangement thus enabling the speed of the winch to be controlled accurately which is of particular importance when the winch is being used to disengage the vehicle from mud, snow or the like under which circumstances the winch speed can synchronize exactly with the speed of the drive wheels so that both the winch and the drive wheels can assist in extracting the vehicle from the mired position.

12 Claims, 7 Drawing Figures

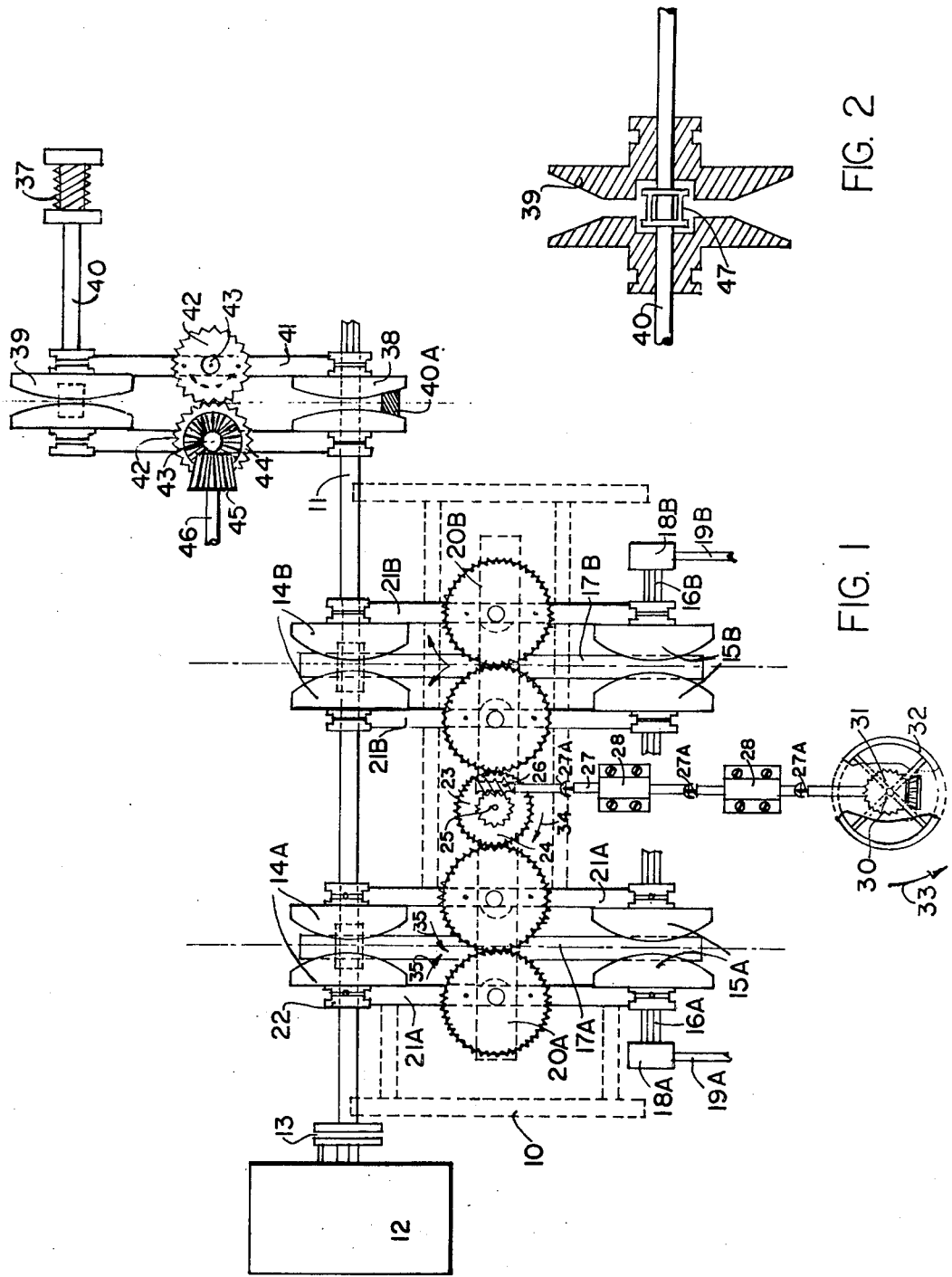

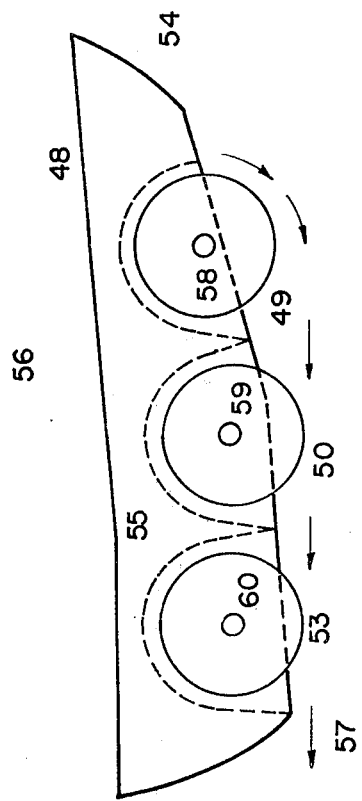
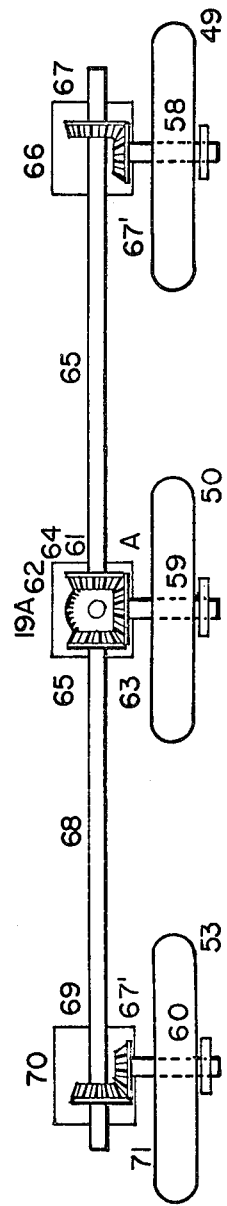
FIG. 3
FIG. 4

AUTOMATIC SYNCHRONIZED PITCH CONTROLS FOR PAIRS OF DRIVER AND DRIVEN V PULLEY DRIVES

BACKGROUND OF THE INVENTION

This invention relates to new and useful improvements in automatic synchronized pitch controls of pairs of driver and driven variable V pulley drives which although designed primarily for use with an all-terrain vehicle, nevertheless can readily be adapted for use in many other environments which require variable synchronized speed control and although the drawings and description refer to an all-terrain vehicle, nevertheless it is to be understood that the invention is not limited to this use.

This invention is an improvement of my invention described in Canadian Pat. No. 889,137. In this patent, the V pulley halves were moved towards and away from one another by a pair of chains attached to fixed arms and it was found that under certain circumstances, the arms flex and do not give absolute pitch control. Furthermore, the chains tend to stretch and generate "play".

SUMMARY OF THE INVENTION

The present invention overcomes these disadvantages by providing an improved control system for pairs of opposed V pulley assemblies by eliminating all chains and arm linkage.

Furthermore a novel winch is provided and operated in a similar manner thus giving precise control of the speed of the winch so that the rate of movement of the winch cable or chain can be synchronized exactly with the rate of the movement of the vehicle thus facilitating the action of the winch when it is used to pull the vehicle from a position in which it has become mired such as heavy mud, snow or the like.

A further object of the invention is to provide a device which is simple in construction and well suited to the purpose for which it is designed.

With the foregoing objects in view, and other such objects and advantages as will become apparent to those skilled in the art to which this invention relates as this specification proceeds, my invention consists essentially in the arrangement and construction of parts all as hereinafter more particularly described, reference being had to the accompanying drawings in which:

BRIEF DESCRIPTION OF THE DRAWINGS

FIG. 1 is a top plan view of the assembly shown per se with supporting structure moved for clarity.

FIG. 2 is an enlarged fragmentary partially sectioned view showing a V pulley assembly used both with the winch application and with the steering mechanism.

FIG. 3 is a schematic side elevation showing an all-terrain vehicle.

FIG. 4 is a partially schematic plan view showing one method of drive connection to the wheels of an all-terrain vehicle.

In the drawings like characters of reference indicate corresponding parts in the different figures.

DETAILED DESCRIPTION

Figure 6:
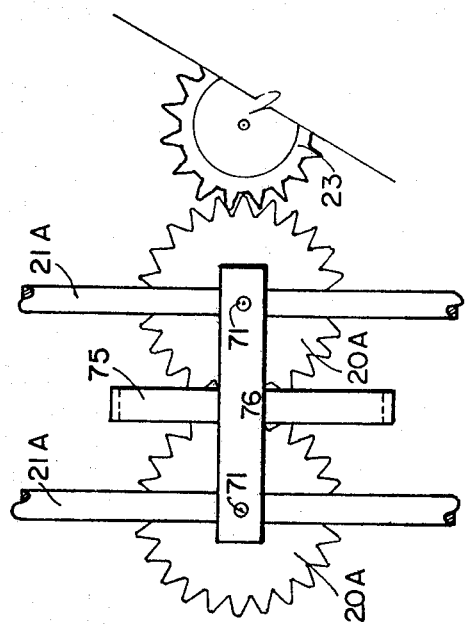
FIG. 6 is a top plan view of FIG. 5.

Dealing first with the disclosure in FIG. 1, reference character 10 illustrates supporting framework in phantom. Supported within this framework and extending transversely therefrom is a main drive shaft 11 driven by a source of power 12 shown schematically. This source of power is connectable and disconnectable from the drive shaft 11 by means of a conventional clutch 13.

Two pairs of split V pulley halves 14A and 14B are splined to shaft 11 for end shiftable movement and a corresponding pair of driven V pulley halves 15A and 15B are mounted upon splined stub shafts 16A and 16B which in turn are mounted for rotation within the frame by conventional bearings (not illustrated). In the claims, the pairs of pulley halves 14A and 14B are defined as first and second drive pulley assemblies respectively and the pairs of pulley halves 15A and 15B are defined as first and second driven pulley assemblies respectively. A V belt 17A extends between the first pulley assemblies 14A and 15A and a similar V belt 17B extends between the second pulley assemblies 14B and 15B.

A three-speed and reverse gear box 18A is shown schematically attached to stub shaft 16A and a similar gear box 18B is shown attached to stub shaft 16B. Each of these gear boxes is provided with a driven shaft 19A and 19B respectively from which the power may be taken to the wheels if the device is used in a vehicle as will hereinafter be described.

The pulley halves are moved towards and away from one another by means hereinafter to be described thus varying the speed of rotation of the stub shafts 16B and 16A and hence the speed of the drive wheels operatively connected thereto.

The means provided takes the form of two pairs of spur gears 20A and 20B supported within the framework and being constantly in mesh as clearly illustrated in FIG. 1. Levers 21A and 21B are secured to the individual spur gears and engage annularly grooved portions 22 on the sides of the pulley halves to move the pulley halves inwardly and outwardly relative to one another upon the splined shafts 11, 16A and 16B. The connections between the levers and the pulley halves are conventional fork type connections which permit the pulley halves to rotate freely within the ends of the levers.

Means are provided to control the movement of the levers 21A and 21B, said means taking the form of a further spur gear 23 journalled upon a shaft 24 and being meshed with the innermost gears of the pairs of spur gears 20A and 20B as clearly shown. The diameter of this spur gear 23 is preferably less than the diameter of the spur gears 20A and 20B and furthermore, the diameters of the spur gears forming each pair is the same.

A skew gear 25 is secured to the shaft 23A upon which spur gear 23 is mounted and worm gear 26 engages this skew gear. This worm gear is rotated by means of a shaft 27 supported in bearings 28 and having a pinion gear 29 secured to the other end thereof which meshes with a crown gear 30 supported upon vertical shaft 31. If necessary, universal joints 27A may be incorporated along the length of shaft 27. A steering wheel 32 is secured to crown gear 30 so that rotation of the steering wheel, rotates shaft 27 and thus turns the gear 23. By selecting the gear ratios, the steering wheel 32 can be designed to move a greater or lesser amount relative to the spur gears 20A and 20B which, of course, are also moved by the movement of gear 23. The worm gear 26 and skew gear 25 give the required gear reduction so that the steering wheel can control small movements of the gears 20A and 20B thus giving excellent steering control to the vehicle.

The steering wheel 32 or some similar actuator, controls the relationship between the pulley halves and if the pulley halves are all equi-distantly spaced, then the drive through shafts 19A and 19B is similar i.e. at the same speed. However, if the steering wheel has been turned as for example, in the direction of arrow 33, then gear 23 moves in the direction of arrow 34 thus moving the spur gears 20A in the direction arrow 35 and the spur gears 20B in the direction of arrow 36. This closes the pulley halves 14A and opens the pulley halves 15A by the same amount, thus slowing down the driven shaft 19A. At the same time, the pulley halves 14B are opened and the pulley halves 15B are closed thus increasing the speed of the driven shaft 19B so that this has the effect of causing the vehicle to turn to the left or in the same direction that the steering wheel 32 was turned. This gives positive steering control to the vehicle or positive variable speed to the pinion shafts 19A and 19B with the basic speed being controlled by the source of power 12 in conjunction with the three-speed gear boxes 18A and 18B.

I have also provided a winch assembly shown schematically by reference character 37 and this is driven from pairs of V pulleys 38 and 39 with a V belt 40A extending therearound. The pulley halves 38 are splined to the end of the aforementioned drive shaft 11 and the pulley halves 39 are splined to the winch shaft 40. Levers 41, similar to the aforementioned levers 21A and 21B, connect between the pulley halves in a similar manner and are secured to meshing spur gears 42 supported on shafts 43 and one of these gears 42 is provided with a crown gear 44 secured thereto engaged by pinion 45 secured to and rotated by shaft 46 which may extend to a conventional control so that the pulley halves 38 and 39 can be opened and closed relative to one another thus controlling the speed of the winch 37. When the pulley halves 39 are in the fully opened position, the V belt 40A drops off to the idler pulley 47 as shown in FIG. 2, said idler pulley running freely upon the winch shaft 40 so that no drive connection is made to the shaft. This arrangement not only allows the winch speed to be controlled but more importantly, allows the winch speed to be accurately synchronized to the forward speed of the vehicle when the winch is being used to assist in retrieving the vehicle from a mired position by anchoring the winch cable to a fixed anchor spaced from the vehicle. This allows full use to be made of the winch and vehicle drive to extract the vehicle.

FIG. 3 shows schematically one form of all-terrain vehicle hull 48 and having three sets of wheels, three upon each side thereof (only one set being shown in FIG. 3). These wheels include a front wheel 49, a central wheel 50 and a rear wheel 53 and are preferably provided with a relatively wide tire (not illustrated). The wheels are mounted upon shafts as will hereinafter be described with the lower portions of the wheels depending below the underside 54 of the hull and the wheel being situated within closed in wheel housings 55 which are relatively close to the periphery of the wheels so that water picked up by the wheels when the vehicle is moving in the direction of arrow 56, is "undershot" in the direction of arrow 47 and is not taken around within the housing by the wheels. This allows the wheels to strike the water relatively rapidly and drive the water backwardly and the machine forwardly or vice versa. Because the wheels are shielded, the vehicle will plane, pivoting about the center wheel 50 so that the front of the vehicle rises and wheel 49 is higher than wheels 50 and 53. In this regard, it will be noted that the axle 58 of the front wheel is higher than the axles 59 and 60 of the other two wheels.

Conventionally, all-terrain vehicles plow through the water relatively slowly whereas in the present design, the vehicle will "plane" thus giving increased speed. Furthermore, if an obstruction is hit by the front wheels, the vehicle will ride over the obstruction rather than plow into it.

FIG. 4 shows one side of a vehicle with the wheels mounted upon the axles and the drive from the driven shaft 19A being connected to the middle wheel and thence extended to the other two wheels.

A gear box 61 is provided and drive shaft 19A is operatively connected to the gear box. A skew gear 62 is secured to the end of shaft 19A within the gear box. This gear is engaged with a pinion gear 63 which in turn is secured to the axle shaft 59 of wheel 50. Also engaged with gear 62 is a pair of pinions 64 and 65. Pinion 64 is secured to shaft 65 which extends forwardly to a further pinion gear 66 contained within a front gear box 67 and engaged with gear 67 which in turn is secured to axle shaft 58 of the front wheel 49.

Gear 65 is secured to axle or shaft 68 which extends to a rear gear box 69 and a skew gear 70 is secured within this gear box to shaft 68. This gear 70 is engaged with a further skew gear 71 which in turn is secured to the axle shaft 60 of the rear wheel 53 thus giving a positive and relatively simple drive to all three wheels and eliminates the necessity of chains, belts and the like.

Figure 5:
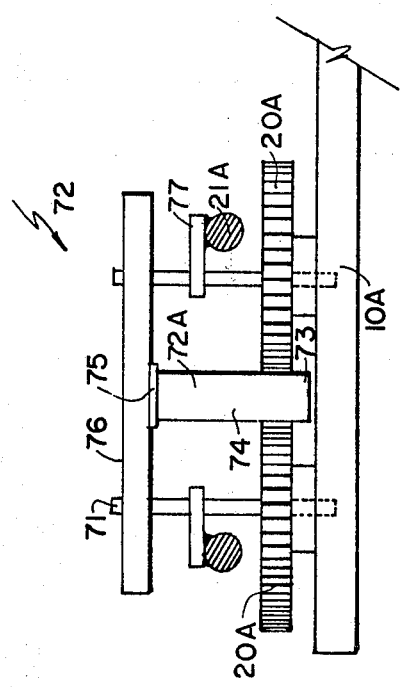
FIG. 5 is a fragmentary front elevation of one set of gears showing the mounting thereof.
Figure 7:
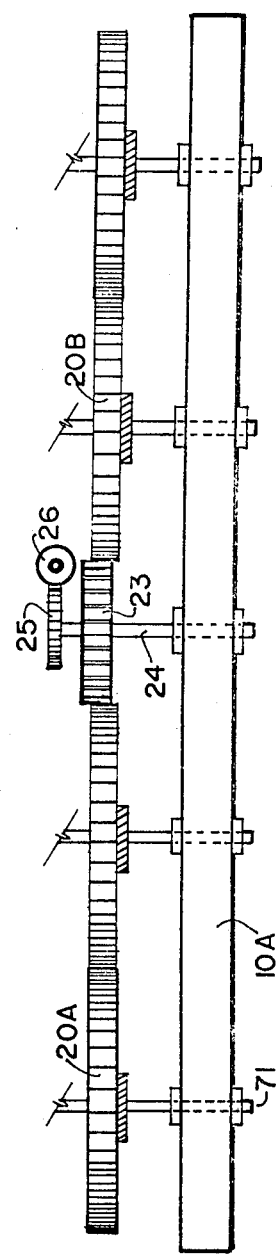
FIG. 7 is a front elevation of the gears and steering connection with supporting structure removed for clarity.

FIGS. 5 and 6 show the method of mounting the gears 20A and 20B, gears 20A being illustrated in these views. Spindles or shafts 71 mount these gears in the framework generally designated 72. It consists of a bridge 72A which includes a lower horizontal strap 73 secured to a frame cross member 10A. Vertical struts 74 extend upwardly from the ends of straps 73 and are connected to an upper horizontal strap 75 spaced and parallel to strap 73.

A shaft support member 76 is secured at right angles to strap 75 and extends upon each side thereof parallel to but spaced above frame member 10A and the spindles or shafts 71 are journalled in this member 76 and within bearings in frame member 10A.

The levers 21A are welded to blocks 77 which in turn are secured to shafts 71 and are rotated thereby.

Finally it should be noted that an idler pulley assembly similar to idler 47 shown in FIG. 2, is provided between each pair of pulley halves and is dimensioned to receive the belts 15A or 15B when that particular pair of pulley halves are opened to the widest position. This prevents the belts from "dropping" between the halves onto the shafts, and also maintains the necessary minimum radius of curvature to the belts thereby preventing damage occurring to the belts.

Inasmuch as the gear boxes 18A and 18B can be provided with a neutral position and the clutch 13 can disconnect the source of power, it is desirable that the belts always maintain driving contact with the pulley halves even at the minimum or lowest speed position thereof.

It should be noted that with this drive system it is possible to transmit relatively large horsepower with excellent pitch control synchronized in controllable pitch integration of driver and driven variable V pulley assemblies.

Also it should be noted that the drive is used for two functions. Firstly, the power transmission in which the gear boxes 18A and 18B are used in conjunction with varying the speed of the source of power 12 as, by example, varying the throttle setting and secondly, for steering control as described.

By placing one gear box in the reverse position and the other in one of the forward speeds, an opposite movement of the final drives is obtained so that the vehicle can turn or pivot with practically no forward or rearward motion, a maneouver particularly suited to ice or snow conditions. This facility is of course particularly useful sense. the device is used in other environments such as industrial or others.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

What I claim as my invention is:

1. A drive mechanism for vehicles and the like having a source of power, comprising in combination with supporting structure, first and second drive pulley assemblies and first and second driven pulley assemblies, a belt operatively extending around said first drive and driven pulley assembly, a further belt operatively extending around said second drive and driven pulley assembly, each of said pulley assemblies including a shaft and a pair of pulley halves splined to said shaft for rotation thereby and endwise movement therealong, means to move the pulley halves of said first drive pulley assembly and said second driven pulley assembly in one direction, and the pulley halves of said second drive pulley assembly and said first driven pulley assembly in the other direction by the same amount and vice versa, said means including a pair of gear components for said first drive and driven pulley assemblies and a pair of gear components for said second drive and driven pulley assemblies, mounted for partial rotation within said supporting structure, each of the gear components of said first drive and driven pulley assemblies being in meshing engagement one with the other, each of said gear components of said second drive and driven components also being in meshing engagement one with the other, a lever operatively connected intermediate the ends thereof to each of said gear components and being operatively connected by one end thereof to the corresponding halves of said first and second drive pulley assemblies and by the other ends thereof to the corresponding halves of said first and second driven pulley assemblies, control means mounted in said supporting structure and means operatively connecting said control means to each pair of meshing gear components, said last mentioned means including a gear in meshing engagement with one of said gear components of said first drive and driven pulley assemblies and with a corresponding one of said gear components of said second drive and driven pulley assemblies whereby partial rotation of said gear causes simultaneous and equal partial rotation of all of said gear components.

2. The device according to claim 1 which includes a belt supporting idler pulley freely rotatable on said drive and driven shafts between each of said pairs of pulley halves, the diameter of said idler pullies being such that said belt is supported thereby when said pulley halves are moved apart.

3. The device according to claim 1 which said control means includes a steering wheel, shaft means operatively connected by one end thereof to said steering wheel and by the other end thereof to said gear.

4. The device according to claim 3 which includes a belt supporting idler pulley freely rotatable on said drive and driven shafts between each of said pairs of pulley halves, the diameter of said idler pullies being such that said belt is supported thereby when said pulley halves are moved apart.

5. The device according to claim 1 which the diameter of each of said gear components is equal, the diameter of said gear is less than the diameter of said gear components.

6. The device according to claim 5 in which said control means includes a steering wheel, shaft means operatively connected by one end thereof to said steering wheel and by the other end thereof to said gear.

7. The device according to claim 6 which includes a belt supporting idler pulley freely rotatable on said drive and driven shafts between each of said pairs of pulley halves, the diameter of said idler pullies being such that said belt is supported thereby when said pulley halves are moved apart.

8. The device according to claim 5 which includes a belt supporting idler pulley freely rotatable on said drive and driven shafts between each of said pairs of pulley halves, the diameter of said idler pullies being such that said belt is supported thereby when said pulley halves are moved apart.

9. In a drive mechanism for vehicles and the like having a source of power, supporting structure, first and second drive pulley assemblies and first and second driven pulley assemblies, a belt operatively extending around said first drive and driven pulley assembly, a further belt operatively extending around said second drive and driven pulley assembly, each of said pulley assemblies including a shaft and a pair of pulley halves splined to said shaft for rotation thereby and endwise movement therealong; the improvement comprising means to move the pulley halves of said first drive pulley assembly and said second driven pulley assembly in one direction and the pulley halves of said second drive pulley assembly and said first driven pulley assembly in the other direction by the same amount and vice versa, said means including a pair of gear components for said first drive and driven pulley assemblies and a pair of gear components for said second drive and driven pulley assemblies, mounted for partial rotation within said supporting structure, each of the gear components of said first drive and driven pulley assemblies being in meshing engagement one with the other, each of said gear components of said second drive and driven components also being in meshing engagement one with the other, a lever operatively connected intermediate the ends thereof to each of said gear components and being operatively connected by one end thereof to the corresponding halves of said first and second drive pulley assemblies and by the other ends thereof to the corresponding halves of said first and second driven pulley assemblies, control means mounted in said supporting structure and means operatively connecting said control means to each pair of meshing gear components, said last mentioned means including a gear in meshing engagement with one of said gear components of said first drive and driven pulley assemblies and with a corresponding one of said gear components of said second drive and driven pulley assemblies whereby partial rotation of said gear causes simultaneous and equal partial rotation of all of said gear components.

10. The device according to claim 9 in which said control means includes a steering wheel, shaft means operatively connected by one end thereof to said steering wheel and by the other end thereof to said gear.

11. The device according to claim 9 in which the diameter of each of said gear components is equal, the diameter of said gear is less than the diameter of said gear components.

12. The device according to claim 11 in which said control means includes a steering wheel, shaft means operatively connected by one end thereof to said steering wheel and by the other end thereof to said gear.

* * * * *